No. 631,995. Patented Aug. 29, 1899.
O. OHLSSON.
JOURNAL BEARING FOR CENTRIFUGAL APPARATUS.
(Application filed Feb. 11, 1899.)

(No Model.)

WITNESSES:

INVENTOR
Olof Ohlsson
BY
ATTORNEY

UNITED STATES PATENT OFFICE.

OLOF OHLSSON, OF SÖDERTELJE, SWEDEN.

JOURNAL-BEARING FOR CENTRIFUGAL APPARATUS.

SPECIFICATION forming part of Letters Patent No. 631,995, dated August 29, 1899.

Application filed February 11, 1899. Serial No. 705,295. (No model.)

*To all whom it may concern:*

Be it known that I, OLOF OHLSSON, a citizen of the United States, residing at Södertelje, in the Kingdom of Sweden, have invented certain new and useful Improvements in Journal-Bearings for Centrifugal Apparatuses, of which the following is a specification.

This invention relates to a cushioned bearing for the upright shaft of a centrifugal apparatus.

It frequently happens that the shaft of a centrifugal drum will cut its bearing and becomes stuck in it, and when this occurs the bearing proper or bushing is very apt to cut the inclosing box, in which case breakage is liable to occur.

The object of this invention is to obviate wholly the difficulty above noted; and to that end it consists, essentially, in providing a bearing for the shaft wherein a coiled or volute spring is fitted into an annular space between the outer box and the bushing which embraces the shaft, said spring, counting from its inner end, being coiled in the direction of rotation of the shaft, whereby it will tend to spring outwardly should the shaft stick in the bushing and carry the latter with it. The spring is not connected or attached in any manner to either the outer box or the bushing, but frictionally embraces the latter.

Figure 1:
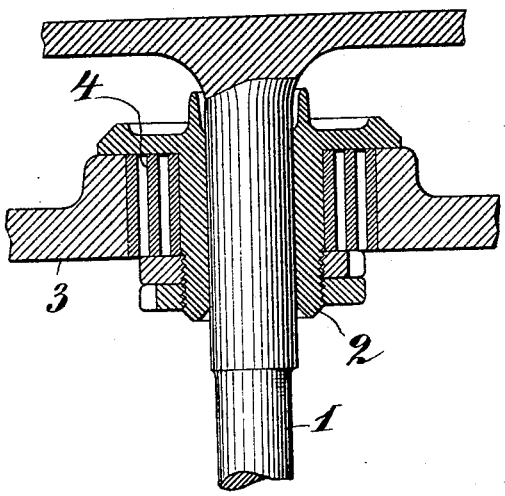
Figure 2:
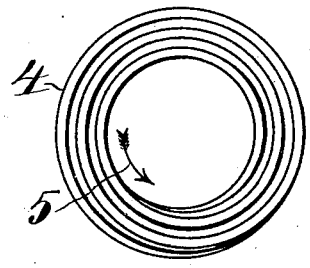

In the accompanying drawings, which illustrate the invention, Figure 1 is a vertical axial section of the outer box, the bushing, and the spring, the shaft being seen in elevation; and Fig. 2 is a plan view of the spring detached.

1 is the shaft; 2, the bushing; 3, the surrounding box, and 4 the spring. In the drawings the spring 4 is represented as of flat material wound or coiled in the direction indicated by the arrow 5, (seen in Fig. 2,) counting from its inner end, and the shaft is supposed to rotate in the direction of said arrow. The spring will be quite strong, and its ends may be flattened or chamfered, as shown, so as to impart to the coil a circular contour interiorly to snugly embrace the bushing and exteriorly to fit into the box. The spring occupies, as seen in Fig. 1, the annular space between the bushing and box, and if the shaft should stick in the bushing and carry the latter around with it the friction of the bushing on the spring will tend to carry the inner whirl of the spring with it, and thus to expand the spring or partly "unwind" it, so to speak, and the spring will thus serve as a yielding elasting bearing for the bushing. Evidently no sticking of the bushing in the spring is possible, as the latter is free to expand. Moreover, the spring exerts a braking action on the bushing, and as a result the rotary motion of the shaft will be sooner arrested after the belt is thrown off than would otherwise be the case. It may be also noted as a beneficial effect of the spring that the heating of the bearing from friction between non-yielding parts is practically avoided. Obviously, also, the spring forming a lateral elastic cushion about all sides of the shaft the latter is free to adjust itself laterally during rotation, and thus center or aline itself.

Having thus described my invention, I claim—

1. A journal-bearing for an upright shaft having an unattached, coiled spring occupying an annular space between the bushing of the bearing and the exterior box, said spring frictionally embracing said bushing and being coiled, counting from its inner end, in the same direction that the shaft rotates, as specified.

2. In a journal-bearing for the shaft of a centrifugal apparatus, the combination with the outer box 3, and the bushing 2, of a coiled spring 4, of flat material occupying an annular space between said bushing and box, said spring being unconnected with the bushing and box except by friction, and being coiled, counting from its inner end, in the direction in which the shaft is to rotate, substantially as set forth.

In witness whereof I have hereunto signed my name in the presence of two subscribing witnesses.

OLOF OHLSSON.

Witnesses:
ERNST SVANQVIST,
E. HERMANSSON.